Sept. 4, 1934.  W. FAIRCHILD  1,972,587
SKILL DEVICE
Filed April 11, 1934
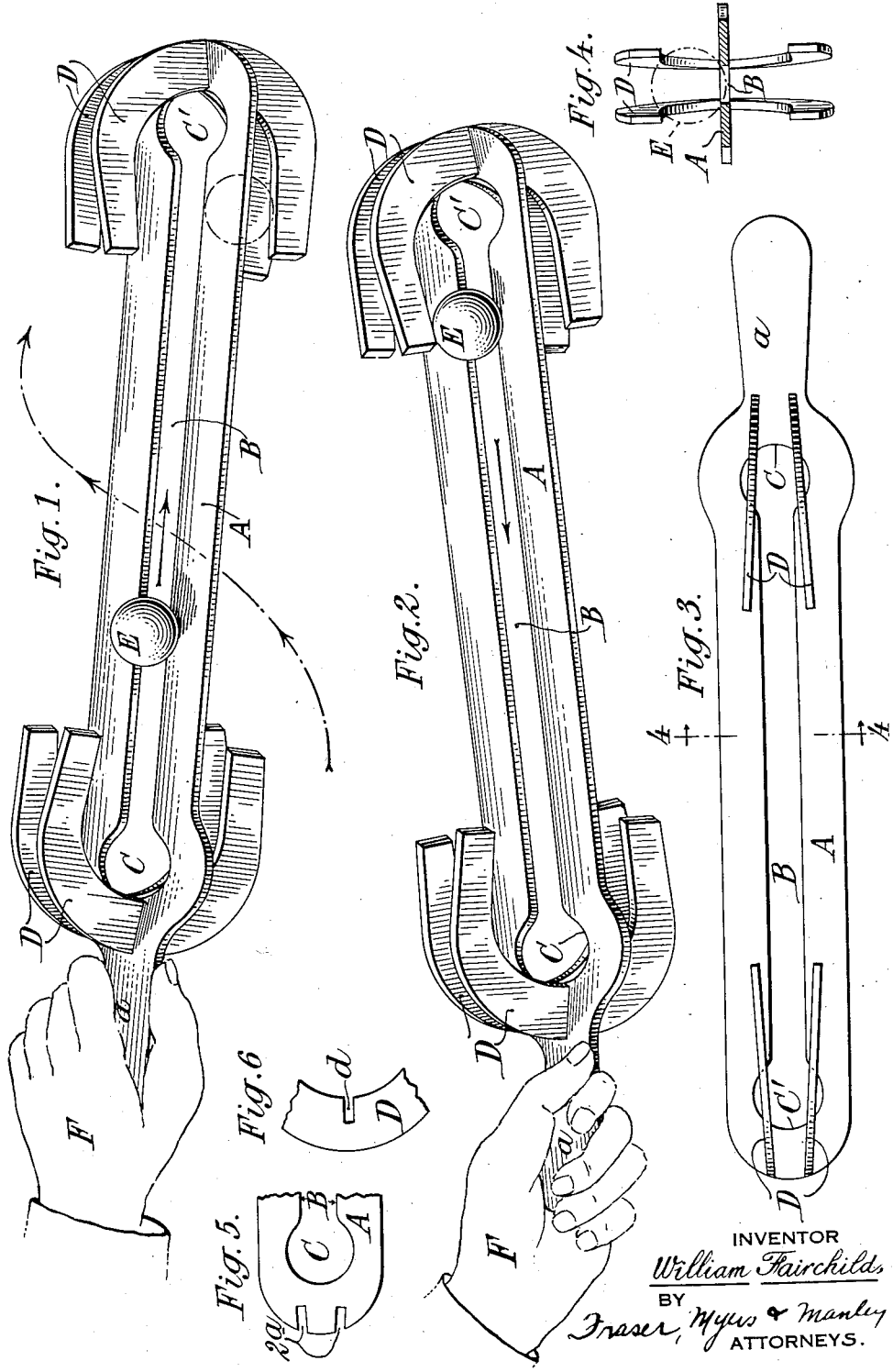
INVENTOR
William Fairchild
BY Fraser, Myers & Manley
ATTORNEYS.

UNITED STATES PATENT OFFICE 1,972,587

SKILL DEVICE

William Fairchild, Albany, N. Y.

Application April 11, 1934, Serial No. 719,997

10 Claims. (Cl. 273—109)

My present invention relates to a skill device and aims to provide certain improvements therein.

An object of my invention is to provide a device of the character described which will be helpful in improving coordination between the eyes and movements of the hand of an individual and which will afford both young and old a source of amusement. A further object is to provide such device which is simple in construction and which can be manufactured and sold at a relatively small cost.

The foregoing and other objects of my invention I accomplish by providing an elongate member with trackways on opposite sides thereof, said trackways being interconnected at adjacent ends through the agency of means such that under skillful manipulation of the device a movable element can be kept in motion forward and backward over said trackways on opposite sides of the member. More specifically the two trackways may be provided by forming a longitudinal slot in a relatively flat member, the ends of said slot terminating in slightly enlarged circular openings and providing said body portion in overlying relation to said enlarged openings with elements having curved or rounded inner faces which will aid in reversing the movement of the movable member upon its passage through said enlarged opening, whereupon by twisting and reversing the inclination of the trackways in a skillful manner the movable member can be kept in motion and prevented from falling from the device.

The invention will be better understood from the detailed description which follows, especially when considered in conjunction with the accompanying drawing showing a preferred embodiment of my invention, and wherein Figure 1 is a perspective view of the skill device embodying my invention;

Fig. 2 is a similar view showing the reverse side of the device in an oppositely inclined position;

Fig. 3 is a top plan view of the device;

Fig. 4 is a section taken along the plane of the line of 4—4 of Fig. 3; and

Figs. 5 and 6 are fractional elevations of parts of the device showing one manner in which said parts may be made.

Referring to the drawing, my skill device may be said to consist of an elongate member A having a parallel-walled slot B extending centrally thereof and terminating at its ends in enlarged circular openings C and C'. Carried by the member A so as to be in overlying relation to the openings C and C' at each end of the slot B are a pair of substantially U or horseshoe-shaped members D which are disposed substantially at right angles to the plane of the member A. Each pair of members D are disposed in slightly divergent relation so that the arms thereof on opposite sides of the member A are slightly farther apart at their inner ends than where they engage the member A. Said members D are also preferably so disposed that their curved inner faces will lie flush with the wall of the openings C and C' at their points of intersection therewith so as to render said openings free from projections or obstruction. One end of the member A beyond the opening C may be of slightly reduced width and shaped to provide an operating handle a, and the body portion surrounding said opening C may be of slightly greater width than the body portion proper so as to provide a reinforcement for the device at the handle end thereof.

The edges of the slot B on either side of the member A provide trackways for a ball E, and the openings C and C' are of a diameter to permit the ball E to freely pass therethough.

It will be appreciated that the body member and the horseshoe members may be made of any suitable material, such as wood, fibre, compressed cardboard, wire, metal, or the like, and that the manner of connection between the members D and A may take any practicable form. As herein shown, the member A may be provided with slots $2a$ of a width corresponding to the thickness of the members D and a depth substantially half the width of the members D, and the members D may be formed with slots $d$ of substantially the size as the slots $a$, the parts D being thereby adapted to fit over and interlock with the part A to provide an overlapping joint. Depending upon the character of the material from which these parts are made, they may be glued, force-fitted, soldered or otherwise connected together.

In the use of the device the handle $a$ is grasped by the hand F of an operator, the ball E placed upon the trackway intermediate its ends, and the device slightly tilted downwardly to cause the ball E to roll down over the device. As it rolls down it will gain momentum and upon reaching the enlarged opening C' will pass therethrough and instantly have its direction of motion changed by engagement with the curved wall of the members D which members serve as traps to restrain the ball from dropping onto the floor. The operator by twisting the device though an arc of approximately 180° and reversing the inclination thereof, will, if the twist and change of direction of the device are made at the proper instant, succeed in causing the ball to roll down the trackway provided by the slot B on the opposite side of the member A. In like manner when the ball reaches the opening C at the handle end of the device by a similar manipulation the direction of motion of the ball after passing through the opening C can be reversed and caused to move over the trackway on the opposite side of the device. With practice an operator's skill can be developed to the extent where the forward and backward motion of the ball over opposite sides of the device can be repeatedly continued.

The distance between the inner ends of the horseshoe members and the distance of said ends above the trackway are such as to permit the ball to nicely clear thereunder, whereas the distance between the members D directly between the enlarged openings C and C' are such as to prevent the ball from dropping directly therethrough. Moreover, the slight inward inclination of the arms of the members D toward the member B will function to restrain the ball from passing through the trap after passing through the enlarged opening due to the momentum which the ball will have acquired and which will tend to throw the ball up against the underside of the track immediately after passing through an end opening. Of course, if the turning and reversing of inclination of the device is not properly controlled, the ball will drop onto the floor either out through the ends of the trap or through the sides thereof.

From the foregoing detailed description it will be apparent that I have provided a device which will greatly aid in developing coordination between the eyes and hand and which will afford a source of amusement and entertainment to all who may use the device. It will also be understood that although I have shown and described but a single embodiment of my invention I do not wish to be limited to the precise details of construction disclosed since the same may be varied without departing from the spirit of my invention.

What I claim is:—

1. A skill device comprising a body member having trackways on opposite sides thereof over which a round element can roll when a trackway is declined, and traps at adjacent ends of the trackways for providing interconnection between the trackways.

2. A skill device comprising a body member having elongate trackways on opposite sides thereof over which a round element can roll when a trackway is declined, and traps at adjacent ends of the trackways having curved inner walls providing interconnection between the trackways.

3. A skill device comprising a body member having trackways on opposite sides thereof over which a round element can roll when a trackway is declined, and traps at adjacent ends of the trackways overlying the latter and adapted to give to the round element when passing over the end of a trackway an initial reversal of directional motion.

4. A skill device comprising an elongate body member having overlying elongate trackways on opposite sides thereof over which a round element can roll when either trackway is declined, and traps at adjacent ends of the trackways providing interconnection therebetween, said traps having curved inner walls overlying said trackways to give to the round element when passing over the end of a trackway an initial reversal of directional motion.

5. A skill device comprising a relatively flat body member having an elongate slot therethrough to provide trackways on opposite sides of the body member over which a round element can roll when the body member is declined, said slot terminating in an enlarged opening, and traps overlying the opposite faces of the body member adjacent the end of the slot, said traps having curved inner walls adapted to give the round object when passing through the enlarged opening in the slot an initial reversal of directional motion.

6. A skill device comprising a relatively flat elongate member having a parallel-walled slot extending longitudinally thereof and terminating in an enlarged circular opening, and substantially U-shaped members carried by and extending substantially at right angles to the elongate member on opposite sides at the end of said member formed with the circular opening and overlying said opening on opposite sides of the elongate member.

7. A skill device comprising a relatively flat elongate member having a parallel-walled slot extending longitudinally thereof and terminating adjacent each end of the member in an enlarged circular opening, substantially U-shaped members carried by and extending at right angles to the elongate member on opposite sides thereof at the ends of said member and overlying said openings, and a handle at one end of said elongate member.

8. A skill device comprising a relatively flat elongate member having a parallel-walled slot extending longitudinally thereof and terminating adjacent each end of the member in an enlarged circular opening, and two horseshoe-shaped members carried by and extending substantially at right angles to the elongate member on opposite sides thereof and overlying said opening in divergent relation thereto at each end of said member, said horseshoe-shaped members having their inner curved walls flush with the circular opening.

9. A skill device comprising a body member having trackways on opposite sides thereof, a ball adapted to roll along said trackways and means at adjacent ends of the trackways having curved inner walls providing interconnection between the trackways adapted to give to the ball an initial reversal of directional motion in passing from the trackway on one side of the body member to the trackway on the opposite side thereof.

10. A skill device comprising a relatively flat body member having an elongate slot therethrough to provide trackways on opposite sides thereof, said slot terminating at each end in an enlarged circular opening, a ball adapted to ride over said trackways and of a diameter to pass through said circular openings, horseshoe members overlying the opposite faces of the body member adjacent the ends of the slot providing interconnection between the trackways and adapted to give to the ball an initial reversal of directional motion in passing through a circular opening.

WILLIAM FAIRCHILD.